Oct. 1, 1940.　　　M. J. DOMAGALA　　　2,216,487

DEVICE FOR ATTACHING LURES TO FISH LINES

Filed April 6, 1939

Inventor

M. J. Domagala

By Clarence A. O'Brien
and Hyman Berman
Attorneys

Patented Oct. 1, 1940

2,216,487

UNITED STATES PATENT OFFICE 2,216,487

DEVICE FOR ATTACHING LURES TO FISH LINES

Martin J. Domagala, Buffalo, N. Y.

Application April 6, 1939, Serial No. 266,349

2 Claims. (Cl. 43—28)

This invention relates to a device for attaching lures, hooks or other devices onto fishing lines, the general object of the invention being to provide means whereby the device can be attached to the line and to the lure or other device, such as a hook or weight without tying or making knots in the parts and very quickly and easily and the parts being separated just as quickly and easily.

Another object of the invention is to so construct the device that it will not submerge the smallest of the dry type of flies below the surface of the water and it will not injure or wear a gut leader or line.

This invention also consists in certain other features of construction and in the combination and arrangement of the several parts to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which.

Figure 1:
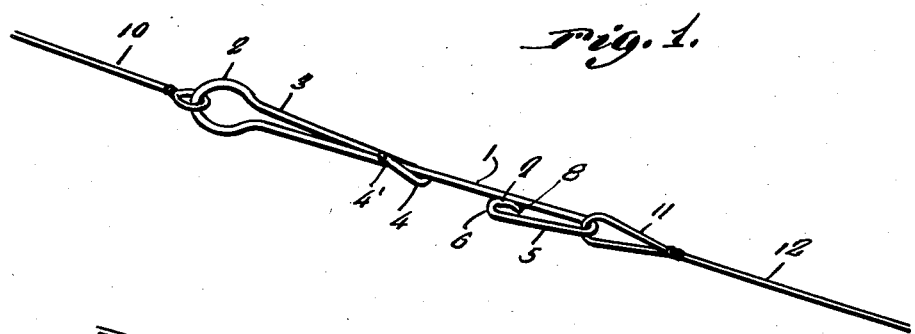
Figure 1 is a perspective view showing the device having one end attached to a line and its other end to a leader of a lure or other device.
Figure 3:
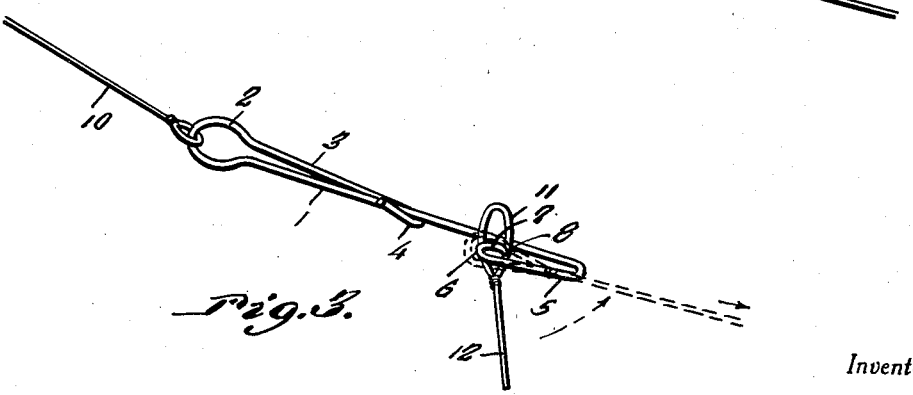
Figure 3 is a view showing how the leader can be engaged or connected with the device.

As shown in these views the device is formed of a single piece of wire and the wire should be of considerable strength but very light so that it will not sink the smallest type of dry fly. The wire is bent to provide a shank 1 having a large eye-forming loop 2 at one end with the short shank 3 extending from the opposite end of the loop 2 with the end of the shank 3 bent to form a hook 4 having a part 4' so formed as to interlock with an intermediate part of the shank 1 when the shank 3 is placed in position to place the hook 4 in engagement with said intermediate part of the shank 1 as shown in Figures 1 and 3.

The other end of the shank 1 is bent to form a substantially oblong loop 5, the terminals of which form a hook 6, the beak part 7 of which is of curved form so that the free end thereof is spaced from the adjacent part of the shank 1 as shown at 8.

Figure 2:
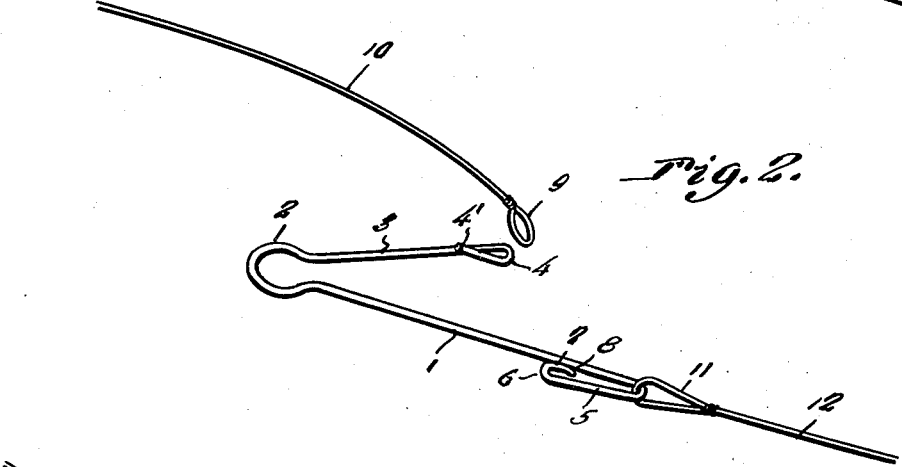
Figure 2 is a view showing how the line can be released from the device.

The device is formed of spring wire so that when the shank 3 is pushed toward the shank 1 the hooks 4 and 4' will engage and lock with the intermediate part of the shank 1. Then when it is desired to open the device as shown in Figure 2 pressure is applied to the part 4 to press it out of engagement with the shank 1 and when it is out of engagement with the shank 1 the tension of the part 2 will cause the shank 3 to separate from the shank 1 as shown in Figure 2 Then the eye 9 of the line 10 can be placed over the shank 2 in engagement with the eye 2 or released from the parts and if a hook is to be used with the device, the eye of the hook can be placed over the part 4' and around the part 4 over the shank 3 and around the part 2 and over the shank 1 and then when the eye of the hook is pressed against the part 7 said part 7 will move outwardly so that the eye can pass between itself and the shank 1 into the loop 5. If a loop 11 of a leader 12 is to be placed into the part 5 then this loop 11 can be placed over the part 6 as shown in Figure 3 and a slight pull exerted upon the leader so that it will move the part 7 away from the shank 1 and at the same time a portion of the loop 11 is passed into the loop 5. When the loop 11 is to be moved from the loop 5 a portion of the loop 11 is placed under the end 8 and pressure applied so that the loop 11 will pass between the part 7 and the shank 1.

It will be understood that the leader 12 can be interchanged with the line 10 so that the line will engage the loop 5 and the leader 12 the eye 2 and any flexible member having loops or eyes at the ends can be easily engaged with either the loop 5 or eye 2 and just as easily disengaged from said parts. Of course, if desired large hooks can be placed over the parts 4', 4 and shank 3 to engage the eye 2 after which the parts are locked together as shown in Figure 3.

It is thought from the foregoing description that the advantages and novel features of the invention will be readily apparent.

It is to be understood that changes may be made in the construction and in the combination and arrangement of the several parts provided that such changes fall within the scope of the appended claims.

Having described the invention, what is claimed as new is:

1. An attachment for connecting lures, hooks and the like to a fish line comprising a member formed of spring wire bent upon itself to form a straight short shank and a straight long shank connected together at their outer ends by an open eye forming loop, said loop normally holding the shanks in diverging position, the free end of the short shank being bent into a hook, the bight of which extends toward the long shank and with its beak forming part extending at an incline across but spaced from the adjacent part of the short shank, said hook interlocking with an intermediate part of the long shank when the short shank is pressed toward the long shank and a loop at the other end of the long shank.

2. An attachment for connecting lures, hooks and the like to a fish line comprising a member formed of spring wire bent upon itself to form a long shank and a short shank connected together by an open loop, the free end of the short shank having a hook part for inter-engaging with an intermediate part of the long shank when the short shank is pressed toward the long shank, an oblong loop at the other end of the long shank terminating in a hook portion, the bight of said hook portion extending toward the long shank, the beak of said hook portion bowed outwardly with its intermediate part contacting the long shank, and the terminal of said hook portion being spaced from the long shank, and said terminal also being spaced from the loop forming part to permit a part of a line to enter the hook portion.

MARTIN J. DOMAGALA.